(12) United States Patent
Gu

(10) Patent No.: US 11,412,063 B2
(45) Date of Patent: *Aug. 9, 2022

(54) METHOD AND APPARATUS FOR SETTING MOBILE DEVICE IDENTIFIER

(71) Applicant: ADVANCED NEW TECHNOLOGIES CO., LTD., Grand Cayman (KY)

(72) Inventor: Siyuan Gu, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 139 days.

This patent is subject to a terminal disclaimer.

(21) Appl. No.: 16/171,791

(22) Filed: Oct. 26, 2018

(65) Prior Publication Data

US 2019/0068745 A1 Feb. 28, 2019

Related U.S. Application Data

(63) Continuation of application No. PCT/CN2017/081032, filed on Apr. 19, 2017.

(30) Foreign Application Priority Data

Apr. 29, 2016 (CN) .......................... 201610282544.0

(51) Int. Cl.
*H04L 67/303* (2022.01)
*H04L 9/40* (2022.01)
(Continued)

(52) U.S. Cl.
CPC ........ *H04L 67/303* (2013.01); *H04L 63/0876* (2013.01); *H04L 67/12* (2013.01); *H04L 67/22* (2013.01); *H04L 67/34* (2013.01)

(58) Field of Classification Search
CPC ... H04L 67/303; H04L 63/0876; H04L 67/12; H04L 67/22; H04L 67/34
(Continued)

(56) References Cited

U.S. PATENT DOCUMENTS 5,748,084 A 5/1998 Isikoff
6,244,758 B1 6/2001 Solymar et al.
(Continued)

FOREIGN PATENT DOCUMENTS

CN 102790961 A1 11/2012
CN 102112991 B 2/2014
(Continued)

OTHER PUBLICATIONS

International Search Report and Written Opinion for Application No. PCT/CN2017/081032, dated Jun. 28, 2017, 8 pages.
(Continued)

*Primary Examiner* — Joseph L Greene

(57) ABSTRACT

A method for setting a device identifier comprises: obtaining a first APP (Application) list of a target device; performing matching between the first APP list and a second APP list to determine a number of identical APPs in both the first APP list and the second APP list; determining whether the determined number of identical APPs reaches a pre-set threshold; and when the determined number of identical APPs reaches the pre-set threshold, setting a device identifier corresponding to the second APP list as the target device's device identifier.

20 Claims, 5 Drawing Sheets

(51) Int. Cl.
*H04L 67/00* (2022.01)
*H04L 67/12* (2022.01)
*H04L 67/50* (2022.01)

(58) Field of Classification Search
USPC .......................................................... 709/224
See application file for complete search history.

(56) References Cited

U.S. PATENT DOCUMENTS

| | | | |
|---|---|---|---|
| 6,269,392 | B1 | 7/2001 | Cotichini et al. |
| 6,275,942 | B1 | 8/2001 | Bernhard et al. |
| 6,300,863 | B1 | 10/2001 | Cotichini et al. |
| 8,838,967 | B1 | 9/2014 | Mills et al. |
| 8,955,142 | B2 | 2/2015 | Blaisdell et al. |
| 9,477,635 | B1 * | 10/2016 | Kuscher ................. G06F 15/177 |
| 9,603,016 | B1 | 3/2017 | Mills et al. |
| 9,801,048 | B1 | 10/2017 | Mills et al. |
| 2005/0021649 | A1 | 1/2005 | Goodman et al. |
| 2005/0216757 | A1 | 9/2005 | Gardner |
| 2006/0107321 | A1 | 5/2006 | Tzadikario |
| 2008/0077793 | A1 | 3/2008 | Tan et al. |
| 2009/0265777 | A1 | 10/2009 | Scott |
| 2010/0030891 | A1 | 2/2010 | Kim et al. |
| 2010/0037301 | A1 | 2/2010 | Jones |
| 2011/0016525 | A1 | 1/2011 | Jeong et al. |
| 2011/0067108 | A1 | 3/2011 | Hoglund |
| 2011/0138470 | A1 | 6/2011 | Davis et al. |
| 2012/0210421 | A1 | 8/2012 | Ormazabal et al. |
| 2013/0278622 | A1 | 10/2013 | Sun et al. |
| 2014/0045456 | A1 * | 2/2014 | Ballai ............... H04W 12/1206 455/410 |
| 2014/0068738 | A1 * | 3/2014 | Harty ..................... G06F 21/44 726/7 |
| 2014/0082350 | A1 | 3/2014 | Zarfoss, III et al. |
| 2014/0122645 | A1 * | 5/2014 | Brown ................... H04L 67/30 709/217 |
| 2014/0283061 | A1 | 9/2014 | Quinlan et al. |
| 2015/0081684 | A1 * | 3/2015 | Lewis .................. H04L 65/403 707/723 |
| 2016/0086207 | A1 | 3/2016 | Tajima |
| 2016/0127367 | A1 * | 5/2016 | Jevans .................... G06F 21/10 713/152 |
| 2016/0149918 | A1 | 5/2016 | Chai et al. |
| 2016/0188308 | A1 * | 6/2016 | Machalani ............ G06F 3/0482 717/178 |
| 2017/0012817 | A1 | 1/2017 | Kuscher et al. |
| 2017/0237646 | A1 * | 8/2017 | Fabjanski ................. G06F 8/71 709/224 |
| 2019/0026344 | A1 | 1/2019 | Liu |

FOREIGN PATENT DOCUMENTS

| | | | |
|---|---|---|---|
| CN | 104066203 A | | 9/2014 |
| CN | 104811931 A | * | 7/2015 ............. H04W 8/26 |
| CN | 104811931 A | | 7/2015 |
| CN | 105357204 A | | 2/2016 |
| EP | 2996366 A1 | | 3/2016 |
| JP | 2016-062489 A | | 4/2016 |
| TW | 201514751 A | | 4/2015 |

OTHER PUBLICATIONS

First Search for Chinese Application No. 201610282544.0 dated Oct. 11, 2019 (1 page).
First Office Action for Chinese Application No. 201610282544.0 dated Oct. 21, 2019 with English machine translation (11 pages).
Search Report for European Application No. 17788689.2 dated Oct. 14, 2019 (10 pages).
Kurtz et al., "Fingerprinting Mobile Devices Using Personalized Configurations," Proceedings on Privacy Enhancing Technologies, Sep. 8, 2015 (16 pages).
Examination Report for European Application No. 17788689.2 dated Mar. 3, 2020.
Second Office Action for Chinese Application No. 201610282544.0 dated Feb. 25, 2020.
Supplementary Search for Chinese Application No. 201610282544.0 dated Mar. 24, 2020.
Office Action for Japanese Application No. 2018-556305 dated Nov. 26, 2019 (8 pages).
International Preliminary Report on Patentability Chapter I for PCT Application No. PCT/CN2017/081032 dated Nov. 8, 2018 (9 pages).
Office Action and Search Report for Taiwanese Application No. 106108024 dated Dec. 27, 2018 (10 pages).
Decision to Reject for Taiwanese Application No. 106108024 dated Mar. 27, 2019 (10 pages).
Office Action for Korean Application No. 10-2018-7034579 dated Jun. 18, 2020.
Examination Report for Indonesian Application No. PID201808641 dated Jul. 1, 2020.

* cited by examiner

US 11,412,063 B2

METHOD AND APPARATUS FOR SETTING MOBILE DEVICE IDENTIFIER

CROSS REFERENCE TO RELATED APPLICATIONS

The present application is a continuation application of the International Patent Application No. PCT/CN2017/081032, filed on Apr. 19, 2017, and titled "METHOD AND APPARATUS FOR SETTING MOBILE DEVICE IDENTIFIER," which claims priority to Chinese Patent Application No. 201610282544.0 filed on Apr. 29, 2016 and entitled "METHOD AND APPARATUS FOR SETTING MOBILE DEVICE IDENTIFIER." The entire contents of all of the above applications are incorporated herein by reference in their entirety.

TECHNICAL FIELD

This application relates to the field of communications, and in particular, to methods and apparatuses for setting a device identifier.

BACKGROUND

With the rapid development of the mobile internet, internet applications are increasingly widespread. Therefore, security and protection have become more and more important, especially in the field of e-commerce, where hacker fraud has caused substantial financial losses.

Device fingerprints, typically comprising certain device identifiers for identifying devices, can be used to determine the identity of a specific device, such as a mobile phone. With a device fingerprint, it is possible to correlate a device with a user's behavior. For example, a device fingerprint can be used to look up the transactions conducted on the most recent day for an account logged onto by a given mobile phone, thereby increasing the dimensionality of transaction security analysis based on device fingerprints to enhance the efficiency of security and protection work and the accuracy of counteractions.

SUMMARY

According to one aspect, a method for setting a device identifier comprises: obtaining a first APP (Application) list of a target device; performing matching between the first APP list and a second APP list to determine a number of identical APPs in both the first APP list and the second APP list; determining whether the determined number of identical APPs reaches a pre-set threshold; and when the determined number of identical APPs reaches the pre-set threshold, setting a device identifier corresponding to the second APP list as the target device's device identifier.

In some embodiments, the identical APPs comprise one or more uncommon APPs.

In some embodiments, a device library comprises a plurality of the second APP lists, and the pre-set threshold is obtained by: conducting a paired comparison of APP quantities in the second APP lists to obtain a reference value, the reference value comprising a minimum value, a maximum value, an average value, or a difference of the APP quantities of the compared second APP lists; obtaining one or more value intervals based on the obtained reference value; and conducting a statistical analysis of a number of identical second APPs in each of the compared second APP lists in each of the value intervals to obtain the pre-set threshold.

In some embodiments, the conducting a statistical analysis of a number of identical second APPs in each of the compared second APP lists in each of the value intervals to obtain the pre-set threshold comprises: sequentially reading target search thresholds from an optimal threshold search range; for each of the value intervals, tallying a number of APP list pairs for which the number of identical second APPs in the second APP lists is greater than the corresponding target search threshold, and for which the second APP lists correspond to a same device identifier, to obtain a first number value; for each of the value intervals, tallying a number of APP list pairs for which the number of identical second APPs in the second APP lists is less than or equal to the corresponding target search threshold, and for which the second APP lists do not correspond to the same device identifier, to obtain a second number value; and obtaining a ratio of the first number value to second number value as a candidate threshold, and obtaining a maximum value of the candidate thresholds for all of the target search thresholds in the optimal threshold search range as the value interval's corresponding optimal threshold.

In some embodiments, the conducting a statistical analysis of a number of identical second APPs in each of the compared second APP lists in each of the value intervals to obtain the pre-set threshold comprises: sequentially reading target search thresholds from an optimal threshold search range; for each of the value intervals, tallying a number of APP list pairs for which the number of identical second APPs in the second APP lists is greater than the corresponding target search threshold, and for which the second APP lists correspond to a same device identifier, to obtain a first number value; for each of the value intervals, tallying a number of APP list pairs for which the number of identical second APPs in the second APP lists is less than or equal to the corresponding target search threshold, and for which the second APP lists do not correspond to the same device identifier, to obtain a second number value; and obtaining a ratio of the second number value to first number value as a candidate threshold, and obtaining a minimum value of the candidate thresholds for all of the target search thresholds in the optimal threshold search range as the value interval's corresponding optimal threshold.

In some embodiments, before the determining whether the determined number of identical APPs reaches a pre-set threshold, further comprising: tallying a number of APPs in the first APP list; respectively comparing the number of APPs in the first APP list to a number of APPs in each of the second APP lists to obtain the reference value; determining a location of the obtained reference value in the value interval; and obtaining the optimal threshold corresponding to the value interval as the pre-set threshold.

In some embodiments, the second APP list is stored in a device library, the method further comprising: when the determined number of identical APPs does not reach the pre-set threshold, allocating another device identifier to the target device, and saving the first APP list and the another device identifier in the device library.

According to another aspect, an apparatus for setting a device identifier, comprising a processor and a non-transitory computer-readable storage medium storing instructions that, when executed by the processor, cause the apparatus to perform a method for setting a device identifier. The method comprises: obtaining a first APP (Application) list of a target device; performing matching between the first APP list and a second APP list to determine a number of identical APPs in both the first APP list and the second APP list; determining whether the determined number of identical APPs reaches a pre-set threshold; and when the determined number of identical APPs reaches the pre-set threshold, setting a device identifier corresponding to the second APP list as the target device's device identifier.

According to another aspect, a non-transitory computer-readable storage medium storing instructions that, when executed by a processor, cause the processor to perform a method for setting a device identifier. The method comprises: obtaining a first APP (Application) list of a target device; performing matching between the first APP list and a second APP list to determine a number of identical APPs in both the first APP list and the second APP list; determining whether the determined number of identical APPs reaches a pre-set threshold; and when the determined number of identical APPs reaches the pre-set threshold, setting a device identifier corresponding to the second APP list as the target device's device identifier.

In this disclosure, by collecting the APP list of a target device and performing matching between the APP list of the target device and several APP lists stored in a device library, the number of identical APPs in the APP list of the target device and in the APP lists of the device library is determined, and it is determined whether the determined number of identical APPs reaches a pre-set threshold. When the number of identical APPs in the APP list of the target device and in any APP list of the device library reaches a pre-set threshold, the device identifier corresponding to this APP list in the device library is set as the device identifier of the target device. Thus, it is possible to use differences in the APPs installed on devices, as obtained by matching APP list information, to identify devices and set device identifiers.

DETAILED DESCRIPTION

In related technologies, identifying a mobile device and setting a device identifier for the mobile device are usually done by collecting the attribute values of multiple device attributes for the mobile device. Based on identical attribute sets, matching is conducted in a device library of previously identified mobile devices, to obtain the difference between the attribute values of this mobile device and the mobile devices in the device library. Then matching is conducted between this difference and a pre-set threshold, to determine whether there is a mobile device in the device library same as this mobile device.

However, in the increasingly complex internet environment, mobile device identification based on device attributes can no longer meet real security and protection demands. For example, in the field of e-commerce, by altering the device attributes of a mobile device, an unknown device is very likely to be identified as a known device, thereby posing a security risk.

This disclosure presents a method for setting a mobile device identifier. By collecting the APP (Application such as mobile phone software Application) list of a target mobile device and performing matching between the APP list of the target mobile device and several APP lists stored in a device library, the number of identical APPs in the APP list of the target mobile device and in the APP lists of the device library is determined, and it is determined whether the determined number of identical APPs reaches a pre-set threshold. When the number of identical APPs in the APP list of the target mobile device and in any APP list of the device library reaches a pre-set threshold, the device identifier corresponding to this APP list in the device library is set as the device identifier of the target mobile device. Thus, it is possible to use differences in the APPs installed on mobile devices, as obtained by matching APP list information, to identify mobile devices and set mobile device identifiers.

The following is a description of this disclosure, using embodiments in combination with application scenarios. For various descriptions of devices described in this disclosure, an exemplary device may comprise a mobile device. Conversely, for various descriptions of mobile devices described in this disclosure, the mobile device may be an example of an device, which may comprise mobile and/or non-mobile devices.

Figure 1:
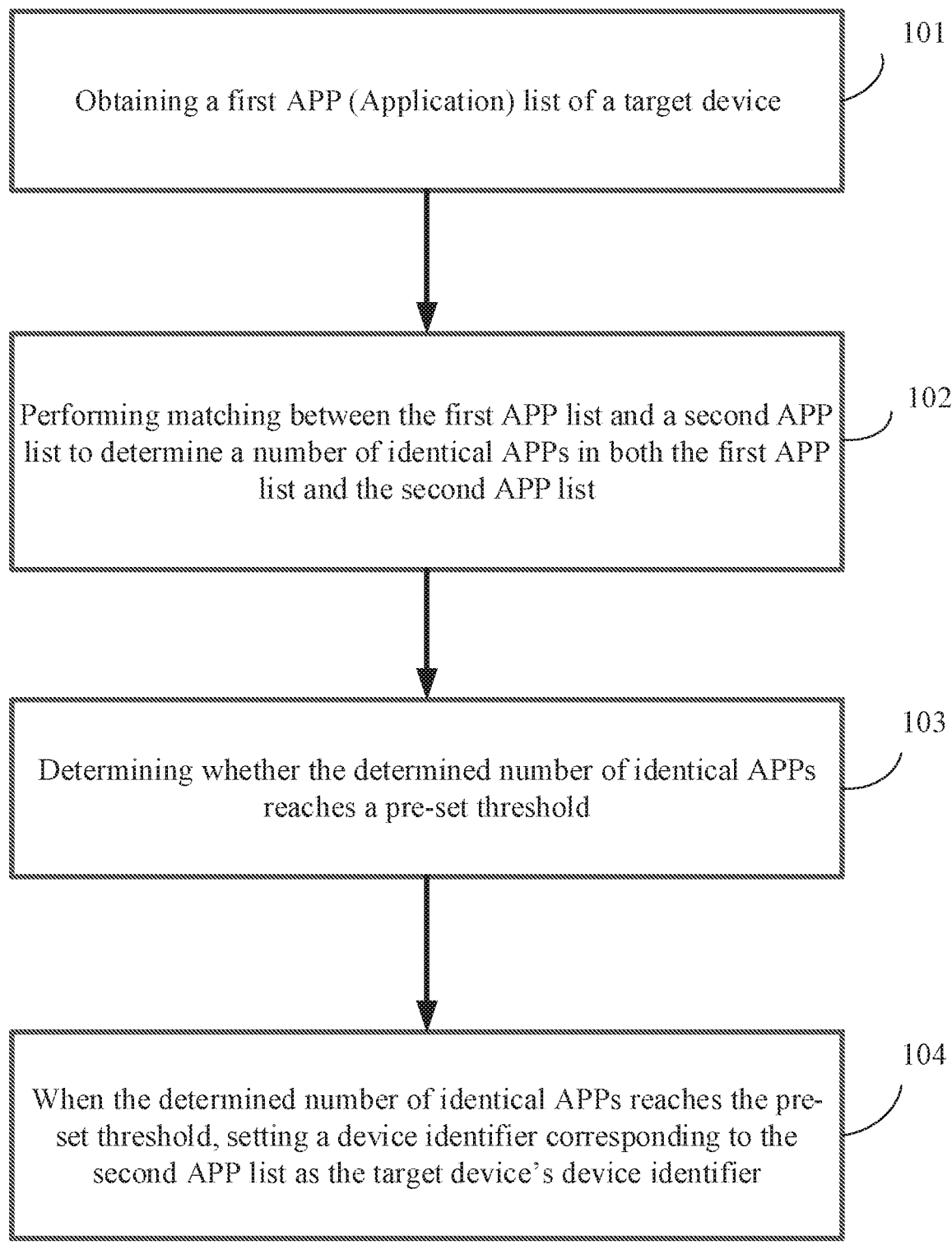
FIG. 1 is a flow chart of the method for setting a device identifier, according to various embodiments of the present disclosure.

FIG. 1 is the method for setting a mobile device identifier, according to some embodiments of the present disclosure, implementable in a server. The method includes the following steps:

Step 101, obtaining a first APP (Application) list of a target device. The first APP list may refer to an APP list of a target mobile device. The target device may comprise, for example, mobile phone, computer, wearable device, laptop, etc.

Step 102, performing matching between the first APP list and a second APP list to determine a number of identical APPs in both the first APP list and the second APP list. The first APP list may refer to an APP list in a device library. For example, step 102 may comprise performing matching between the APP list of the target mobile device and several APP lists stored in a device library, to determine the number of identical APPs in the APP list of the target mobile device and in the APP lists in the device library; wherein, corresponding device identifiers are pre-allocated to the several APP lists. The second APP list may be associated with a device such as mobile phone, computer, wearable device, laptop, etc.

Step 103, determining whether the determined number of identical APPs reaches a pre-set threshold; here, the pre-set threshold is an optimal threshold found by performing a statistical analysis based on the number of identical APPs among the APP lists in the device library.

Step 104, when the determined number of identical APPs reaches the pre-set threshold, setting a device identifier corresponding to the second APP list as the target device's device identifier. For example, step 104 may comprise, when the number of identical APPs in the APP list of the target mobile device and in any APP list in the device library reaches the pre-set threshold, the device identifier corresponding to this APP list in the device library is set as the device identifier of the target mobile device.

The mobile device may comprise a smart mobile device, e.g., a smartphone.

The server may comprise a server, server cluster, or cloud platform built upon a server cluster.

With respect to the first or second APP lists, the APP list may comprise a list comprising information on the APPs installed on a mobile device. In an exemplary application, the server may collect information on the APPs installed on a mobile device, then use this collected information on the APPs to create an APP list corresponding to the mobile device.

Each of the second APP lists in the device library may be associated with a device (e.g., mobile device), which has been allocated with an unique device identifier. The association may be obtained, verified, and stored in advance.

The number and types of APPs installed on mobile devices will often differ among different mobile devices. Therefore, in this example, the server may identify a mobile device based on differences in the number and types of installed APPs among mobile devices, by conducting matching of the APP lists of mobile devices. Thus, it is possible to allocate unique device identifiers to different mobile devices based on matching of APPs in the APP lists of the mobile devices.

In this example, the server may collect the information on the APPs installed on a mobile device based on data scraping. "Data scraping" may refer to the process of searching for information hidden in large amounts of data based on pre-set algorithms.

Based on a pre-set algorithm, the server may conduct calculations using large amount of data produced by mobile devices as data samples, search in the large amount of data produced by the mobile devices for information on the APPs installed on the mobile device, and then create an APP list for the mobile device based on the searched information on the APPs installed on the mobile device.

No special limitation is made in this example as to the algorithm employed when the server executes data scraping. A person skilled in the art may reference explanations in related technologies when implementing the technical schemes of this disclosure. For example, in an exemplary application, the algorithm may comprise statistical online analysis processing and machine learning algorithms.

In addition, in this example, the server uses the differences in the number and types of APPs installed on a mobile device to determine the identity of the mobile device and allocate a unique device identifier to the mobile device. Therefore, when the server uses data scraping to collect information on the APPs installed on the mobile device, priority may be given to collect information on those APPs with a high degree of device distinguishability. For example, priority may be given to collect information on uncommon APPs. The identical APPs in step 102 may comprise one or more uncommon APPs. Uncommon APPs are less commonly installed in devices than "widespread" applications, and more commonly installed in devices than "rare" applications. The "widespread" and "rare" applications are described below.

In some embodiments, APPs with a high degree of device distinguishability will often comprise APPs that can characterize APP installation differences among different mobile devices. That is, for these APPs with a high degree of distinguishability, the probability of them being installed on different mobile devices at the same time is relatively low, and the probability of them being installed at different times is also relatively low. Therefore, by performing matching of these APPs with a high degree of distinguishability installed on different mobile devices, it is possible to accurately reflect differences in the APPs installed on different mobile devices, thereby making it possible to uniquely determine the identity of different mobile devices.

On one hand, for APPs with relatively "widespread" applications (such as Alipay), there is a very high probability that this APP is installed on different mobile devices, so this APP has a relatively poor degree of distinguishability for devices. For example, an APP installed in more than a preset threshold percentage (e.g., 90%) of a pool of devices as reflected from the APP lists in the device library can be defined as a "widespread" application.

On the other hand, for APPs with "rare" applications, there is a very high probability that this APP is not installed on mobile devices, so this APP also has a relatively poor degree of distinguishability for devices. For example, an APP installed in less than a preset threshold percentage (e.g., 10%) of a pool of devices as reflected from the APP lists in the device library can be defined as a "rare" application.

Apps with a relatively poor degree of distinguishability for devices cannot precisely reflect differences in the APPs installed on mobile devices. Therefore, if the server uses APPs with a relatively poor degree of distinguishability to create an APP list, when the server goes on to identify devices based on differences among installed APPS resulting from APP list matching, it is possible that two different devices will be identified as the same device.

Conversely, APPs with a relatively low probability of being installed on different mobile devices at the same time and with a relatively low probability of being installed at different times have a high degree of device distinguishability.

For example, for different types of bank client Apps, the probability that these APPs will be installed on the mobile devices of different users at the same time and at different times is moderate. Also, the bank APP combinations used by different users are not the same. For example, some users use a combination of China Construction Bank APP+China Merchants Bank APP on their mobile devices, and some users use a combination of ICBC bank APP+Bank of Communications on their mobile devices. Therefore, using these APP combinations can do a very good job of differentiating different devices.

In this example, after the server uses data scraping to collect the APP lists of a large number of mobile devices, the server may conduct encoding and storage of the collected APP lists using a unified format.

In an example for encoding collected APP lists, the server may conduct encoding based on whether the APP list includes designated APPs. Here, the designated APPs comprise APPs with a high degree of distinguishability, as described above; the encoding mode may be 0, 1 encoding.

For example, the server may pre-designate several APPs with a high degree of distinguishability, and then traverse a collected APP list, encoding the APP list's APPs with a high degree of distinguishability as 1, and encoding the APP list's APPs not having a high degree of distinguishability as 0. Then, standard storage is conducted according to the format of the encoded APP list.

In another example for encoding collected APP lists, the server may also conduct encoding of the APP list based on the serial numbers of all the APPs in the APP list.

For example, the server can conduct uniform numeration of all the APPs that may be installed by a mobile device. Next, the server uses the serial numbers of the APPs to encode the APP list, and then standard storage is conducted according to the format of the encoded APP list. The encoded APP list will include the serial numbers of all the APPs installed by the current mobile device.

Through encoding of collected APP lists according to a unified format, it is possible to quantify the information in the collected APP lists as standard, straightforward numbers, thereby making the later process of using APP list matching to determine differences in the number and types of APPs installed on different mobile devices faster and easier.

Of course, in actual applications, other forms of encoding may be used when encoding collected APP lists. In this example, they are not listed one by one.

In this example, after the server conducts encoding and storage of the collected APP lists, the server may select some of the APP lists from the encoded APP lists to create a device library (e.g., APP lists for which the identity of the corresponding mobile devices are known may be selected to create a device library). At this point, each record in the device library corresponds to a list of APPs installed on the corresponding mobile device.

In some embodiments, corresponding device identifiers may be allocated by the server to the APP lists stored in the device library. This device identifier may comprise information identifying the mobile device corresponding to the APP list. For example, the device identifier may comprise information such as the mobile device's IMEI (International Mobile Equipment Identity), MAC (Media Access Control address), or an identification file on the mobile device.

In addition, there is often a certain temporal relationship among the collection times for the APP lists in the device library (e.g., a sequential order for the collection times of each APP list), and the APPs installed on a mobile device may change with the passing of time. Therefore, in the APP lists stored in the device library, there may be a situation in which the same device identifier is allocated to APP lists with different recorded information.

In this example, the server creates a complete device library, i.e., a database to conduct APP list matching when it is necessary to determine the identity of, and set a device identifier for, a target mobile device. Here, the target mobile device may comprise an unknown device the APP list of which the server can collect and the identity of which cannot be determined.

When determining the identity of the target mobile device, the server can compare the number of identical APPs in the APP list of the target mobile device and in the APP list of the device library to a pre-set threshold. By determining whether this number of identical APPs reaches the pre-set threshold, whether this target mobile device is the same as the device corresponding to the APP list in the device library is determined.

In this example, the pre-set threshold is an optimal threshold found after conducting a statistical analysis based on the number of identical APPs in the APP lists in the device library.

Figure 2:
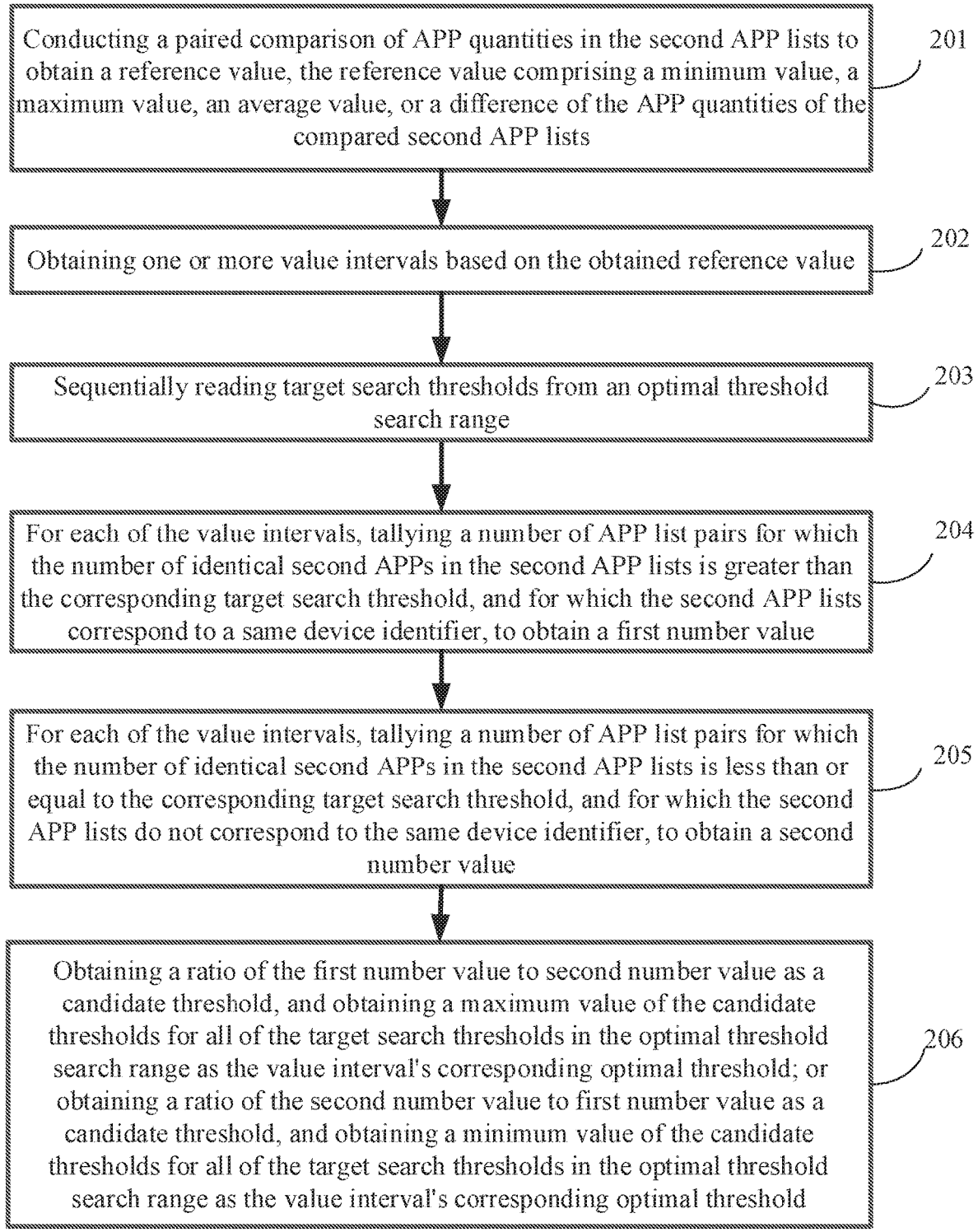
FIG. 2 is a flow chart of using a statistical analysis of the number of identical APPs in the APP lists of a device library to set the aforementioned pre-set threshold, according to various embodiments of the present disclosure.

FIG. 2 is a flow chart of the process of setting a pre-set threshold by conducting a statistical analysis of the number of identical APPs in the APP lists of a device library, illustrated by this example. In various embodiments, the device library may comprises a plurality of the second APP lists, and to obtain the pre-set threshold, the process comprises the following steps:

Step 201, conducting a paired comparison of APP quantities in the second APP lists to obtain a reference value, the reference value comprising a minimum value, a maximum value, an average value, or a difference of the APP quantities of the compared second APP lists. For example, step 201 may comprise conducting a paired comparison of the APP quantities in the several APP lists stored in the device library, and calculating a set reference value; the set reference value comprising the minimum value of, maximum value of, average value of, or difference between the APP quantities of the compared APP lists.

Step 202, obtaining one or more value intervals based on the obtained reference value. For example, step 202 comprises partitioning at least one value interval based on the calculated reference value.

In this example, when conducting a paired comparison of the APP quantities in several APP lists stored in a device library, the APP lists stored in the device library may be compared in pairs to obtain several APP list pairs. Afterward, the APP quantities for each APP list pair are compared.

In some embodiments, "pairing" means that from all the APP lists stored in the device library, any two APP lists are grouped together. In this way, it is possible to obtain all the possible APP list pairs from all the APP lists stored in the device library.

For example, it is assumed that the device library comprises the three APP lists A1, A2, and A3. The APP list pairs generated by pairing comprise the three APP list pairs of (A1, A2), (A1, A3), and (A2, A3).

The number of APP list pairs resulting from pairing is usually determined by the number of APP lists stored in the device library. For example, when a device library stores 1000 APP lists, the number of APP list pairs from pairing may be on the order of $C_{1000}^2$.

After several APP list pairs are obtained through pairing, the server may tally the number of APPs in the APP lists of each APP list pair and compare the number of APPs in the APP lists of the APP list pair. After the comparison, the server may extract a pre-set reference value, and then partition at least one value interval based on the extracted reference value.

In some embodiments, the pre-set reference value may comprise the minimum value, maximum value, average value, or difference between the APP quantities of the compared APP lists.

In an example of using the minimum value among the APP quantities of the compared APP lists as the reference value, each APP list pair can include the two APP lists of A1 and A2, and the server can tally up $N_{A1}$ and $N_{A2}$ as the numbers of APPs installed in APP lists A1 and A2, respectively. Next, $N_{A1}$ and $N_{A2}$ are compared for minimum value $N_{min}$. Here, $N_{min}$ is the reference value. Finally, an $N_{min}$ value can be found for every APP list pair, and the server can conduct interval partitioning based on the $N_{min}$ value obtained for each APP list pair, to obtain at least one value interval.

Similarly, when the pre-set reference value is the maximum value, average value, or difference between the APP quantities of the compared APP lists, the same processing may be performed, using the maximum value, average value, or difference (absolute value) between $N_{A1}$ and $N_{A2}$ as the reference value, and conducting numeric interval partitioning based on this reference value.

No special limitation is made in this example as to the strategy of partitioning numeric intervals based on the pre-set reference value. During implementation, the user may manually conduct static partitioning, or the server may conduct partitioning based on a pre-set interval partitioning algorithm.

In addition, no limitation is made in this example as to the number of partitioned numeric intervals. For example, when a user manually conducts static partitioning, the number of data intervals may be set by the user based on their demands;

when partitioning is based on a pre-set interval partition algorithm, the number of data intervals is determined by this algorithm.

After the server partitions at least one value interval based on the calculated reference value, this partitioned value interval will include several APP list pairs.

Still taking the example of using the minimum value among the APP quantities of the compared APP lists as the reference value, it is assumed that the final partitioned value interval is [1,6]. For a random APP list pair, if this APP list pair includes the two APP lists of A1 and A2, the numbers of installed APPs in APP list A1 and A2 are $N_{A1}$ and $N_{A2}$, and the minimum value of $N_{A1}$ and $N_{A2}$ is $N_{min}$. If the value of $N_{min}$ falls within the value interval [1,6], this APP list pair belongs to this value interval. That is, value interval [1,6] will include all the APP list pairs for which the calculated $N_{min}$ value falls within interval [1,6].

After step 202, a statistical analysis of a number of identical second APPs in each of the compared second APP lists in each of the value intervals may be conducted to obtain the pre-set threshold, the details of which are described with reference to steps 203-206 below:

Step 203, sequentially reading target search thresholds from an optimal threshold search range (e.g., a set optimal threshold search range).

Step 204, for each of the value intervals, tallying a number of APP list pairs for which the number of identical second APPs in the second APP lists is greater than the corresponding target search threshold, and for which the second APP lists correspond to a same device identifier, to obtain a first number value. For example, step 204 may comprise, for each value interval, tallying the number of APP list pairs for which the number of identical APPs in the APP lists is greater than the target search threshold, and for which the mobile device identifiers corresponding to the APP lists are the same, to obtain a first number value.

Step 205, for each of the value intervals, tallying a number of APP list pairs for which the number of identical second APPs in the second APP lists is less than or equal to the corresponding target search threshold, and for which the second APP lists do not correspond to the same device identifier, to obtain a second number value. For example, step 205 may comprise, for each value interval, tallying the number of APP list pairs for which the number of identical APPs in the APP lists is less than or equal to the target search threshold, and for which the mobile device identifiers corresponding to the APP lists are not the same, to obtain a second number value.

In this example, after at least one value interval is partitioned based on the calculated reference value, the server can conduct a statistical analysis based on the number of identical APPs in the APP list pairs in each partitioned value interval, to set an optimal threshold corresponding to each value interval.

When setting optimal thresholds for each value interval, the server can pre-set an optimal threshold search range for each numeric interval, and the server can sequentially read the target search thresholds from within this optimal threshold search range. For example, it is assumed that the set optimal threshold search range is [1,10]. The server can sequentially read the target search thresholds 1, 2, 3 . . . in this interval until all the integer thresholds in the interval have been read.

In an illustrated implementation manner, the server reads an optimal search threshold from the optimal threshold search range: on one hand, the server can tally the number of APP list pairs in each value interval for which the number of identical APPs in the APP lists that is greater than the target search threshold, and for which the device identifiers corresponding to the APP lists are the same, to obtain a first number value; on the other hand, the server can tally the number of APP list pairs in each value interval for which the number of identical APPs in the APP lists is less than or equal to the target search threshold, and for which the device identifiers corresponding to the APP lists are not the same, to obtain a second number value.

After the server tallies the first number value and second number value, the server can use this first number value to second number value ratio to set an optimal threshold corresponding to each interval.

Step 206 may comprise step 206-1: obtaining a ratio of the first number value to second number value as a candidate threshold, and obtaining a maximum value of the candidate thresholds for all of the target search thresholds in the optimal threshold search range as the value interval's corresponding optimal threshold. For example, step 206-1 may comprise calculating the first number value to second number value ratio to obtain a best candidate threshold, and finding the maximum value of the calculated best candidate thresholds for all the search thresholds in the optimal threshold search range, to serve as the value interval's corresponding optimal threshold. Alternatively, step 206 may comprise step 206-2: obtaining a ratio of the second number value to first number value as a candidate threshold, and obtaining a minimum value of the candidate thresholds for all of the target search thresholds in the optimal threshold search range as the value interval's corresponding optimal threshold. For example, step 206-2 may comprise calculating the second number value to first number value ratio to obtain a best candidate threshold, and finding the minimum value of the calculated best candidate thresholds for all the search thresholds in the optimal threshold search range to serve as the value interval's corresponding optimal threshold.

In this example, when the server sets an optimal threshold for each numeric interval based on the tallied first number and second number values: in one implementation mode, the server can calculate the first number value to second number value ratio, and let this ratio serve as the best candidate threshold based on the read target search threshold and calculated for the current value interval.

The server can repeat the calculation process, calculating the best candidate threshold for each target search threshold read from the optimal threshold search range. Next, it tallies the maximum value from all the best candidate thresholds calculated for all the search thresholds in this optimal threshold search range, to serve as the optimal threshold corresponding to the current value interval.

In another implementation mode, the server can calculate the second number value to first number value ratio, and let this ratio serve as the best candidate threshold based on the read target search threshold, calculated for the current value interval.

The server can repeat the calculation process, calculating the best candidate threshold for each target search threshold read from the optimal threshold search range. Next, the server can tally the minimum value from all the best candidate thresholds calculated for all the search thresholds in this optimal threshold search range, to serve as the optimal threshold corresponding to the current value interval.

In this example, based on the aforementioned calculation method, the server can set optimal thresholds corresponding to each partitioned value interval. After an optimal threshold corresponding to each value interval has been set, the server can store the correspondence between each value interval and its optimal threshold in the device library in data table form, to facilitate invoking this correspondence in the future.

The above describes the process of the server conducting a statistical analysis based on the number of identical APPs in the APP lists in a device library, to set an optimal threshold.

After the server determines the number of identical APPs in the APP list of the target mobile device and in the several APP lists stored in the device library, the server can compare this number of identical APPs to the optimal threshold to determine whether the target mobile device is an existing device in the device library.

Figure 3:
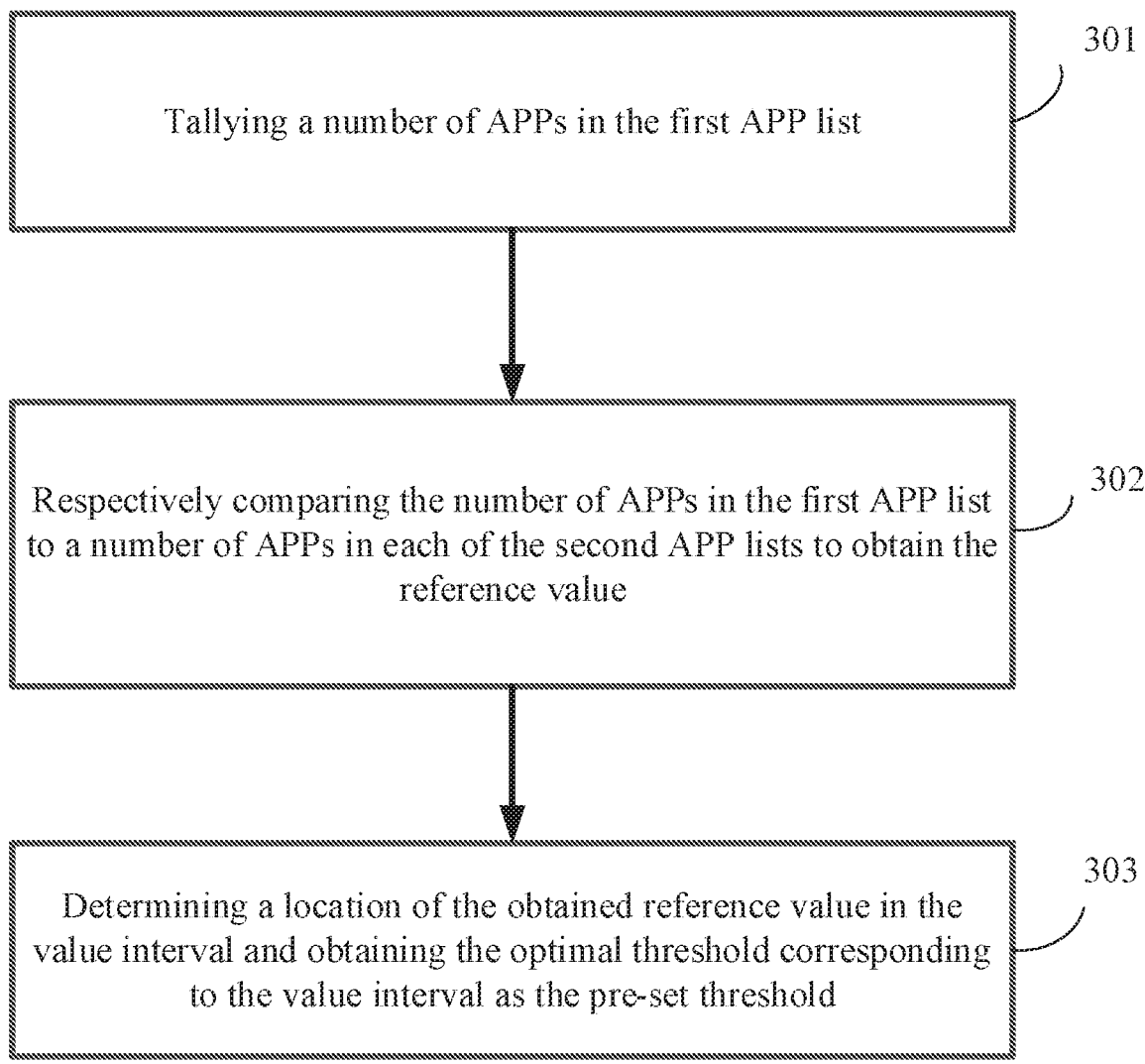
FIG. 3 is a flow chart of using APP list matching to determine an optimal threshold for a target device, according to various embodiments of the present disclosure.

FIG. 3 is a flow chart of the process of using APP list matching to determine an optimal threshold for a target mobile device, according to various embodiments of the present disclosure. The process comprises the following steps:

Step 301, tallying a number of APPs in the first APP list. For example, step 301 may comprise tallying the number of APPs in the APP list of the target mobile device.

In this example, after the server collects the APP list of the target mobile device, first the server can encode the collected target mobile device APP list using the same encoding mode as the APP lists in the device library.

After encoding is completed, based on the information recorded in the encoded APP list, the server can tally the number of APPs installed on this target mobile device.

For example, it is assumed that the APP lists of target mobile devices employ a 0, 1 encoding mode based on whether the APP list includes designated APPs. The designated APPs included in the APP lists are encoded as 1, and APPs other than those designated are encoded as 0. When the server determines the number of APPs in the target mobile device APP list, the server can directly tally the number of APPs in this APP list encoded as 1.

Similarly, the server can also use the same mode to tally the number of APPs in the APP lists of the device library.

Step 302, respectively comparing the number of APPs in the first APP list to a number of APPs in each of the second APP lists to obtain the reference value. For example, step 302 comprises separately comparing the number of APPs in the APP list of the target mobile device to the number of APPs in each APP list stored in the device library, and calculating the pre-set reference value.

After the server determines the number of APPs in the target mobile device APP list and in the device library APP lists, the server can conduct matching between the APP quantity of the target mobile device APP list and the APP quantities of the APP lists stored in the device library, one by one, and extract the pre-set reference value.

In some embodiments, this extracted reference value needs to be analyzed statistically by the server with the number of identical APPs in the APP lists in the device library, to set the optimal threshold, and consistent with the reference value used when partitioning numeric intervals.

For example, it is assumed that the value interval is partitioned by the server based on the minimum value of compared APP list APP numbers. The reference value extracted by the server while conducting matching between the APP quantity of the target mobile device APP list and, one by one, the APP quantities of the APP lists stored in the device library will be the minimum value of the APP quantity of the target mobile device APP list and the APP quantities of the APP lists stored in the device library.

Step 303, determining a location of the obtained reference value in the value interval and obtaining the optimal threshold corresponding to the value interval as the pre-set threshold. For example, step 303 comprises looking up the value interval where this calculated reference value is located, and obtaining the optimal threshold corresponding to this value interval to serve as the pre-set threshold.

In this example, after the server conducts matching, one by one, between the APP quantity of the target mobile device APP list and the APP quantities of the APP lists stored in the device library, and extracts the pre-set reference value, the server can look up the value interval in which the extracted reference value is located.

Prior to this, the server has conducted a statistical analysis based on the number of identical APPs in the APP lists in the device library, has set an optimal threshold for each value interval, and has saved the correspondence between each value interval and its optimal threshold. Therefore, after looking up the value interval in which the reference value is located, the server can use this correspondence to look up the optimal threshold corresponding to the value interval in which the reference value is located.

This looked-up optimal threshold is the pre-set threshold used to determine whether the target mobile device is an existing device in the device library.

In this example, after the server determines the optimal threshold corresponding to the target mobile device, the server can continue to conduct matching, one by one, between the target mobile device APP list and the APP lists stored in the device library, to determine the number of identical APPs in the target mobile device APP list and in the APP lists of the device library.

In some embodiments, the number of identical APPs is the number of identical APPs installed on the target mobile device and on the device in the device library.

For example, it is assumed that the target mobile device APP list and the APP lists in the device library both employ a 0, 1 encoding mode based on whether the APP list includes designated APPs. The designated APPs included in the APP lists are encoded as 1, and APPs other than those designated are encoded as 0. When the server determines the number of identical APPs in the target mobile device APP list and in a given APP list in the device library, the server can directly tally the number of APPs encoded as 1 in the two matched APP lists.

After the server tallies the number of identical APPs in the target mobile device APP list and in each of the device library's APP lists, the server can compare this number of identical APPs to the determined optimal threshold, and determine whether the determined number of identical APPs reaches this optimal threshold.

In some embodiments, when the number of identical APPs in the target mobile device APP list and in a given APP list of the device library reaches this optimal threshold, it means that the target mobile device may be the same device as the mobile device corresponding to this APP list in the device library. Under these circumstances, the server can directly set the device identifier pre-allocated to this APP list in the device library as the device identifier of the target mobile device.

At this point, based on APP list matching, the server has successfully identified the target mobile device and has set a corresponding device identifier for the target mobile device. Afterward, the server can execute security and protection work for the target mobile device based on its device identifier.

For example, in the field of e-commerce, the server can use the device identifier of the target mobile device as the device fingerprint. Based on this device fingerprint, the server can look up all the recent transactions for an account logged onto using this mobile device, and then conduct a transaction security analysis of all the looked-up transactions, to boost the efficiency of security and protection work.

In some embodiments, if the number of identical APPs in the target mobile device APP list and in all the APP lists of the device library fails to reach the optimal threshold, it means that the target mobile device may be different from all the mobile devices corresponding to the APP lists in the device library. At such a time, the target mobile device is not an existing device in the device library. Under these circumstances, the server can allocate a new device identifier, which is different from all of the APP lists in the device library, for the wireless identification of this target, based on a pre-set identifier allocation strategy. Afterward, the APP list of this target mobile device and the target mobile device's allocated device identifier are saved to the device library, for future queries.

As the preceding embodiments show, this disclosure uses the collection of the APP list of a target mobile device and matching between the APP list of the target mobile device and several APP lists stored in a device library to determine the number of identical APPs in the APP list of the target mobile device and in the APP lists of the device library, and to determine whether the determined number of identical APPs reaches a pre-set threshold. When the number of identical APPs in the APP list of the target mobile device and in any APP list of the device library reaches a pre-set threshold, the device identifier corresponding to this APP list in the device library is set as the device identifier of the target mobile device. Thus, it is possible to use differences in the APPs installed on mobile devices, as obtained by matching APP list information, to identify a mobile device and set a device identifier for the mobile device. Because the pre-set threshold in this application is an optimal threshold found after conducting a statistical analysis based on the number of identical APPs in the APP lists in the device library, the accuracy of device identification can be improved.

Corresponding to the aforementioned method embodiment, this disclosure also provides an apparatus embodiment.

Figure 4:
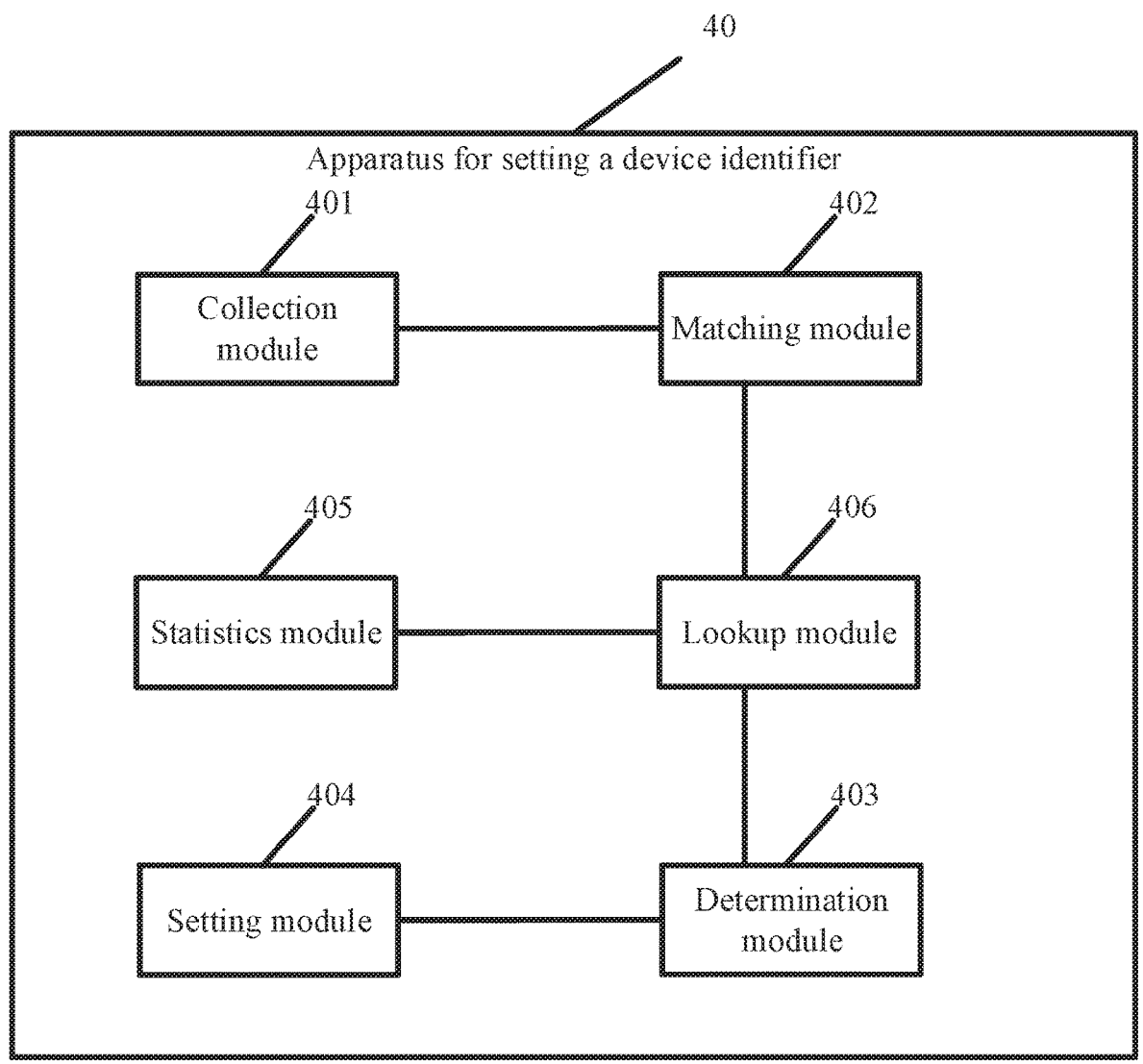
FIG. 4 is a logic block diagram of an apparatus for setting a device identifier, according to various embodiments of the present disclosure.
Figure 5:
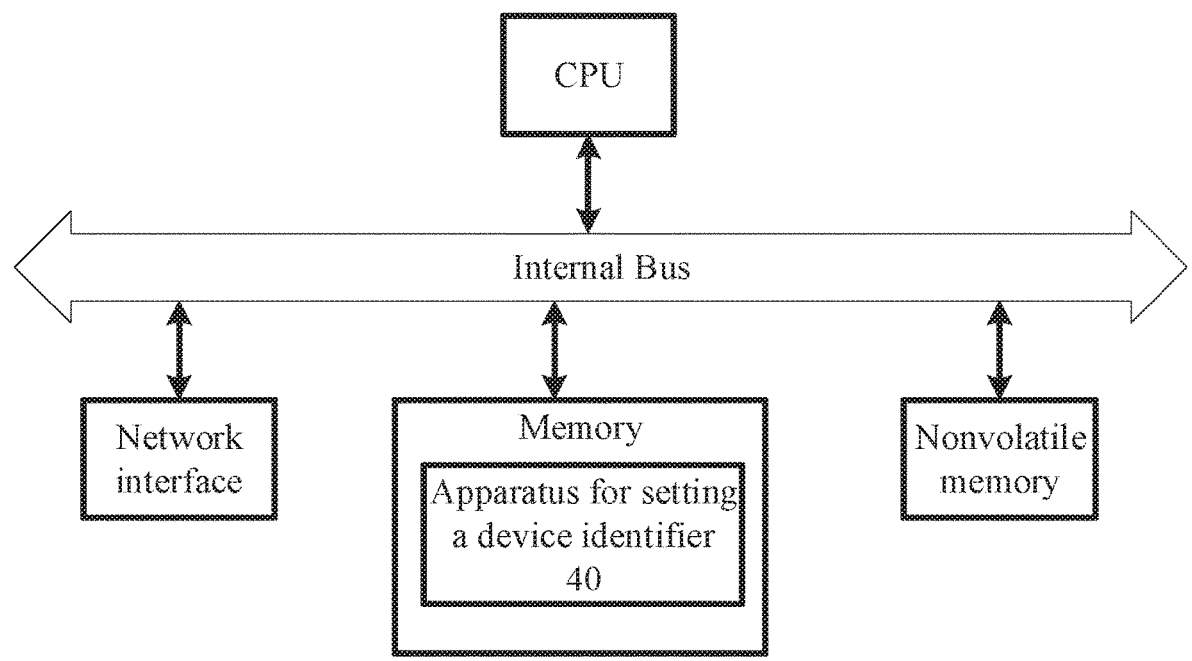
FIG. 5 is a hardware structure diagram of a system for setting a device identifier, according to various embodiments of the present disclosure.

Please refer to FIG. 4. This disclosure presents an apparatus for setting a device identifier 40, implementable in a server. Here, as shown in FIGS. 4 and 5, the hardware structure of a server carrying the apparatus for setting a mobile device identifier 40 may comprise a CPU, memory, nonvolatile memory, network interface, and internal bus. In an example of software implementation, the apparatus for setting a mobile device identifier 40 can be understood as a computer program loaded into the memory, forming a combined software-hardware logic apparatus after being run on a CPU, the apparatus 40 comprising: a collection module 401, configured to collect the APP list of a target mobile device; a matching module 402, performing matching between the APP list of the target mobile device and several APP lists stored in a device library, to determine the number of identical APPs in the APP list of the target mobile device and in the APP lists in the device library; wherein, corresponding device identifiers are pre-allocated to the several APP lists; determination module 403, configured to determine whether the determined number of identical APPs reaches a pre-set threshold; setting module 404, configured to set the device identifier corresponding to an APP list in the device library as the device identifier of the target mobile device when the number of identical APPs in the APP list of the target mobile device and in this APP list in the device library reaches the pre-set threshold.

In this example, the APP list includes several designated APPs; the designated APPs comprise APPs capable of characterizing the APP installation differences among different mobile devices and differentiating among different mobile devices.

In this example, the pre-set threshold is an optimal threshold found by performing a statistical analysis based on the number of identical APPs among the APP lists in the device library. The apparatus 40 may also comprise: a statistics module 405, configured to conduct a paired comparison of the APP quantities in the several APP lists, and calculate a set reference value; partition at least one value interval based on the calculated reference value; and conduct a statistical analysis of the number of identical APPs in the APP lists of the APP list pairs included in each partitioned value interval.

In this example, the statistics module 405 is configured to: sequentially read target search thresholds from the set optimal threshold search range; for each value interval, tally the number of APP list pairs for which the number of identical APPs in the APP lists is greater than the target search threshold, and for which the mobile device identifiers corresponding to the APP lists are the same, to obtain a first number value; for each value interval, tally the number of APP list pairs for which the number of identical APPs in the APP lists is less than or equal to the target search threshold, and for which the mobile device identifiers corresponding to the APP lists are not the same, to obtain a second number value; calculate the first number value to second number value ratio to obtain a best candidate threshold, and find the maximum value of the calculated best candidate thresholds for all the search thresholds in the optimal threshold search range, to serve as the value interval's corresponding optimal threshold; or calculate the second number value to first number value ratio to obtain a best candidate threshold, and find the minimum value of the calculated best candidate thresholds for all the search thresholds in the optimal threshold search range to serve as the value interval's corresponding optimal threshold.

In this example, the apparatus 40 also comprises: a lookup module 406, configured to tally the number of APPs in the APP list of the target mobile device before the determination module determines whether the determined number of identical APPs reaches a pre-set threshold; separately compare the number of APPs in the APP list of the target mobile device to the number of APPs in each APP list stored in the device library, and calculate the pre-set reference value; look up the value interval where this calculated reference value is located; and obtain the optimal threshold corresponding to this value interval to serve as the pre-set threshold.

In this example, the setting module 404 is further configured to: when the determined number of identical APPs in the APP list of the target mobile device and the APP lists of the device library does not reach the pre-set threshold, allocate another device identifier to the target mobile device, and save the first APP list of the target mobile device and the another device identifier allocated to the target mobile device in the device library.

In some embodiments, the various modules and units of the apparatus 40 may be implemented as software instructions (or a combination of software and hardware). That is, the apparatus 40 described with reference to FIG. 4 may comprise a processor and a non-transitory computer-readable storage medium storing instructions that, when executed by the processor, cause one or more components (e.g., the processor) of the apparatus 40 to perform various steps and methods of the modules and units described above. In some embodiments, the apparatus 40 may include a mobile phone, a tablet computer, a PC, a laptop computer, a server, or another computing device.

FIG. 5 show an exemplary system (e.g., server) for setting a mobile device identifier. In some embodiments, the system may comprise the apparatus 40 implemented as software instructions in a memory. The term "non-transitory media," and similar terms, as used herein refers to a media that store data and/or instructions that cause a machine to operate in a specific fashion, the media excludes transitory signals. Such non-transitory media may comprise non-volatile media and/or volatile media, such as the memory and nonvolatile memory shown in FIG. 5. Non-volatile media includes, for example, optical or magnetic disks. Volatile media includes dynamic memory. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The Network interface shown in FIG. 5 provides a two-way data communication coupling to one or more network links that are connected to one or more local networks. For example, network interface may be an integrated services digital network (ISDN) card, cable modem, satellite modem, or a modem to provide a data communication connection to a corresponding type of telephone line. As another example, network interface may be a local area network (LAN) card to provide a data communication connection to a compatible LAN (or WAN component to communicated with a WAN). Wireless links may also be implemented. In any such implementation, network interface sends and receives electrical, electromagnetic or optical signals that carry digital data streams representing various types of information.

In view of the present disclosure, a person skilled in the art can easily conceive of other implementation schemes for this disclosure. This disclosure is designed to cover any modifications, uses, or adaptive changes of this disclosure. These modifications, uses, or adaptive changes follow the general principles of this disclosure and comprise common knowledge or customary technical means in the art, undisclosed by this disclosure. The Description and embodiments are merely illustrative.

This disclosure is not limited to the exact structures described above and illustrated in the accompanying drawings, and modifications and changes may be made without departing from the scope of this disclosure.

The preceding are merely the preferred embodiments of this disclosure. They do not limit this disclosure. All modifications, equivalent substitutions, and improvements made within the spirit and principles of this disclosure shall fall within the scope of protection of this disclosure.

The invention claimed is:

1. A method for setting a device identifier, comprising: obtaining a first APP (Application) list of a target device; performing matching between the first APP list and each of a plurality of second APP lists to determine a number of identical APPs in both the first APP list and each of the second APP lists; determining whether the determined number of identical APPs reaches a pre-set threshold, wherein the pre-set threshold is an optimal threshold obtained by: conducting a paired comparison of APP quantities in the second APP lists to obtain an average value of the APP quantities of each pair of the compared second APP lists; obtaining one or more value intervals based on the obtained average value of the APP quantities of each pair of the compared second APP lists; and conducting a statistical analysis of a number of identical second APPs in each of the compared second APP lists in each of the one or more value intervals to obtain the pre-set threshold; and when the determined number of identical APPs of the target device and one of the second APP lists reaches the pre-set threshold, setting a device identifier corresponding to the one of the second APP lists as a device identifier of the target device.

2. The method according to claim 1, wherein the first APP list includes designated APPs.

3. The method according to claim 1, wherein the conducting a statistical analysis of a number of identical second APPs in each of the compared second APP lists in each of the one or more value intervals to obtain the pre-set threshold comprises:
sequentially reading target search thresholds from an optimal threshold search range;
for each of the one or more value intervals, tallying a number of APP list pairs for which the number of identical second APPs in the second APP lists is greater than a corresponding target search threshold, and for which the second APP lists correspond to a same device identifier, to obtain a first number value;
for each of the one or more value intervals, tallying a number of APP list pairs for which the number of identical second APPs in the second APP lists is less than or equal to the corresponding target search threshold, and for which the second APP lists do not correspond to the same device identifier, to obtain a second number value; and
obtaining a ratio of the first number value to the second number value as a candidate threshold, and obtaining a maximum value of the candidate thresholds for all of the target search thresholds in the optimal threshold search range as a corresponding optimal threshold for a value interval of the one or more value intervals.

4. The method according to claim 3, before the determining whether the determined number of identical APPs reaches a pre-set threshold, further comprising:
tallying a number of APPs in the first APP list;
respectively comparing the number of APPs in the first APP list to a number of APPs in each of the second APP lists to obtain a first reference value;
determining a first value interval of the one or more value intervals that includes the first reference value; and
obtaining an optimal threshold corresponding to the first value interval as the pre-set threshold.

5. The method according to claim 1, wherein the conducting a statistical analysis of a number of identical second APPs in each of the compared second APP lists in each of the one or more value intervals to obtain the pre-set threshold comprises:
sequentially reading target search thresholds from an optimal threshold search range;
for each of the one or more value intervals, tallying a number of APP list pairs for which the number of identical second APPs in the second APP lists is greater than the corresponding target search threshold, and for which the second APP lists correspond to a same device identifier, to obtain a first number value;
for each of the one or more value intervals, tallying a number of APP list pairs for which the number of identical second APPs in the second APP lists is less than or equal to the corresponding target search threshold, and for which the second APP lists do not correspond to the same device identifier, to obtain a second number value; and obtaining a ratio of the second number value to the first number value as a candidate threshold, and obtaining a minimum value of the candidate thresholds for all of the target search thresholds in the optimal threshold search range as a corresponding optimal threshold for a value interval of the one or more value intervals.

6. The method according to claim 5, before the determining whether the determined number of identical APPs reaches a pre-set threshold, further comprising:

tallying a number of APPs in the first APP list;

respectively comparing the number of APPs in the first APP list to a number of APPs in each of the second APP lists to obtain a first reference value;

determining a first value interval of the one or more value intervals that includes the first reference value; and obtaining an optimal threshold corresponding to the first value interval as the pre-set threshold.

7. The method according to claim 1, wherein the second APP lists are stored in a device library, the method further comprising:

when the determined number of identical APPs does not reach the pre-set threshold, allocating a new device identifier to the target device, and saving the first APP list and the new device identifier in the device library.

8. An apparatus for setting a device identifier, the apparatus comprising a processor and a non-transitory computer-readable storage medium storing instructions that, when executed by the processor, cause the apparatus to perform operations comprising:

obtaining a first APP (Application) list of a target device;

performing matching between the first APP list and each of a plurality of second APP lists to determine a number of identical APPs in both the first APP list and each of the second APP lists; determining whether the determined number of identical APPs reaches a pre-set threshold, wherein the pre-set threshold is an optimal threshold obtained by: conducting a paired comparison of APP quantities in the second APP lists to obtain an average value of the APP quantities of each pair of the compared second APP lists; obtaining one or more value intervals based on the obtained average value of the APP quantities of each pair of the compared second APP lists; and conducting a statistical analysis of a number of identical second APPs in each of the compared second APP lists in each of the one or more value intervals to obtain the pre-set threshold; and when the determined number of identical APPs of the target device and one of the second APP lists reaches the pre-set threshold, setting a device identifier corresponding to the one of the second APP lists as a device identifier of the target device.

9. The apparatus according to claim 8, wherein the first APP list includes designated APPs.

10. The apparatus according to claim 9, wherein the conducting a statistical analysis of a number of identical second APPs in each of the compared second APP lists in each of the one or more value intervals to obtain the pre-set threshold comprises:

sequentially reading target search thresholds from an optimal threshold search range;

for each of the one or more value intervals, tallying a number of APP list pairs for which the number of identical second APPs in the second APP lists is greater than a corresponding target search threshold, and for which the second APP lists correspond to a same device identifier, to obtain a first number value;

for each of the one or more value intervals, tallying a number of APP list pairs for which the number of identical second APPs in the second APP lists is less than or equal to the corresponding target search threshold, and for which the second APP lists do not correspond to the same device identifier, to obtain a second number value; and obtaining a ratio of the first number value to the second number value as a candidate threshold, and obtaining a maximum value of the candidate thresholds for all of the target search thresholds in the optimal threshold search range as a corresponding optimal threshold for a value interval of the one or more value intervals.

11. The apparatus according to claim 10, wherein before the determining whether the determined number of identical APPs reaches a pre-set threshold, the method further comprises:

tallying a number of APPs in the first APP list;

respectively comparing the number of APPs in the first APP list to a number of APPs in each of the second APP lists to obtain a first reference value;

determining a first value interval of the one or more value intervals that includes the first reference value; and obtaining an optimal threshold corresponding to the first value interval as the pre-set threshold.

12. The apparatus according to claim 9, wherein the conducting a statistical analysis of a number of identical second APPs in each of the compared second APP lists in each of the one or more value intervals to obtain the pre-set threshold comprises:

sequentially reading target search thresholds from an optimal threshold search range;

for each of the one or more value intervals, tallying a number of APP list pairs for which the number of identical second APPs in the second APP lists is greater than the corresponding target search threshold, and for which the second APP lists correspond to a same device identifier, to obtain a first number value;

for each of the one or more value intervals, tallying a number of APP list pairs for which the number of identical second APPs in the second APP lists is less than or equal to the corresponding target search threshold, and for which the second APP lists do not correspond to the same device identifier, to obtain a second number value; and obtaining a ratio of the second number value to the first number value as a candidate threshold, and obtaining a minimum value of the candidate thresholds for all of the target search thresholds in the optimal threshold search range as a corresponding optimal threshold for a value interval of the one or more value intervals.

13. The apparatus according to claim 12, before the determining whether the determined number of identical APPs reaches a pre-set threshold, the method further comprises:

tallying a number of APPs in the first APP list;

respectively comparing the number of APPs in the first APP list to a number of APPs in each of the second APP lists to obtain a first reference value;

determining a first value interval of the one or more value intervals that includes the first reference value; and obtaining an optimal threshold corresponding to the first value interval as the pre-set threshold.

14. The apparatus according to claim 8, wherein the second APP lists are stored in a device library, the method further comprising:
when the determined number of identical APPs does not reach the pre-set threshold, allocating a new device identifier to the target device, and saving the first APP list and the new device identifier in the device library.

15. A non-transitory computer-readable storage medium storing instructions that, when executed by a processor, cause the processor to perform operations comprising: obtaining a first APP (Application) list of a target device; performing matching between the first APP list and each of a plurality of second APP lists to determine a number of identical APPs in both the first APP list and each of the second APP lists; determining whether the determined number of identical APPs reaches a pre-set threshold, wherein the pre-set threshold is an optimal threshold obtained by: conducting a paired comparison of APP quantities in the second APP lists to obtain an average value of the APP quantities of each pair of the compared second APP lists; obtaining one or more value intervals based on the obtained average value of the APP quantities of each pair of the compared second APP lists; and conducting a statistical analysis of a number of identical second APPs in each of the compared second APP lists in each of the one or more value intervals to obtain the pre-set threshold; and when the determined number of identical APPs of the target device and one of the second APP lists reaches the pre- set threshold, setting a device identifier corresponding to the one of the second APP lists as a device identifier of the target device.

16. The non-transitory computer-readable storage medium according to claim 15, wherein the conducting a statistical analysis of a number of identical second APPs in each of the compared second APP lists in each of the one or more value intervals to obtain the pre-set threshold comprises:
sequentially reading target search thresholds from an optimal threshold search range;
for each of the one or more value intervals, tallying a number of APP list pairs for which the number of identical second APPs in the second APP lists is greater than a corresponding target search threshold, and for which the second APP lists correspond to a same device identifier, to obtain a first number value;
for each of the one or more value intervals, tallying a number of APP list pairs for which the number of identical second APPs in the second APP lists is less than or equal to the corresponding target search threshold, and for which the second APP lists do not correspond to the same device identifier, to obtain a second number value; and
obtaining a ratio of the first number value to the second number value as a candidate threshold, and obtaining a maximum value of the candidate thresholds for all of the target search thresholds in the optimal threshold search range as a corresponding optimal threshold for a value interval of the one or more value intervals.

17. The non-transitory computer-readable storage medium according to claim 15, wherein the conducting a statistical analysis of a number of identical second APPs in each of the compared second APP lists in each of the one or more value intervals to obtain the pre-set threshold comprises:
sequentially reading target search thresholds from an optimal threshold search range;
for each of the one or more value intervals, tallying a number of APP list pairs for which the number of identical second APPs in the second APP lists is greater than the corresponding target search threshold, and for which the second APP lists correspond to a same device identifier, to obtain a first number value;
for each of the one or more value intervals, tallying a number of APP list pairs for which the number of identical second APPs in the second APP lists is less than or equal to the corresponding target search threshold, and for which the second APP lists do not correspond to the same device identifier, to obtain a second number value; and
obtaining a ratio of the second number value to the first number value as a candidate threshold, and obtaining a minimum value of the candidate thresholds for all of the target search thresholds in the optimal threshold search range as a corresponding optimal threshold for a value interval of the one or more value intervals.

18. The non-transitory computer-readable storage medium according to claim 16, before the determining whether the determined number of identical APPs reaches a pre-set threshold, further comprising:
tallying a number of APPs in the first APP list;
respectively comparing the number of APPs in the first APP list to a number of APPs in each of the second APP lists to obtain a first reference value;
determining a first value interval of the one or more value intervals that includes the first reference value; and
obtaining an optimal threshold corresponding to the first value interval as the pre-set threshold.

19. The non-transitory computer-readable storage medium according to claim 17, before the determining whether the determined number of identical APPs reaches a pre-set threshold, further comprising:
tallying a number of APPs in the first APP list;
respectively comparing the number of APPs in the first APP list to a number of APPs in each of the second APP lists to obtain a first reference value;
determining a first value interval of the one or more value intervals that includes the first reference value; and
obtaining an optimal threshold corresponding to the first value interval as the pre-set threshold.

20. The non-transitory computer-readable storage medium according to claim 15, wherein the first APP list includes designated APPs.

* * * * *